United States Patent [19]

Parrish

[11] Patent Number: 4,592,882
[45] Date of Patent: Jun. 3, 1986

[54] METHOD OF MAKING ALUMINUM-RESISTANT TITANIUM DIBORIDE ARTICLES

[75] Inventor: Lien N. Parrish, Parma Heights, Ohio

[73] Assignee: Union Carbide Corporation, Danbury, Conn.

[21] Appl. No.: 600,899

[22] Filed: Apr. 16, 1984

Related U.S. Application Data

[63] Continuation of Ser. No. 480,516, Mar. 30, 1983, abandoned.

[51] Int. Cl.$^4$ .................... C04B 35/64; C04B 35/56; C01B 35/04; F27B 9/04
[52] U.S. Cl. ........................................ 264/66; 264/63; 264/570; 501/92; 501/96; 423/297
[58] Field of Search ............ 204/243 R, 280, 292–294, 204/67; 264/56; 501/96, 92; 264/56; 423/297

[56] References Cited

U.S. PATENT DOCUMENTS

| | | | |
|---|---|---|---|
| 3,316,062 | 4/1967 | Cicione et al. | 423/297 |
| 4,108,670 | 8/1978 | Steiger et al. | 501/96 |
| 4,181,584 | 1/1980 | Steiger et al. | 204/67 |
| 4,231,853 | 11/1980 | Rahn | 204/243 R |
| 4,275,026 | 6/1981 | Hazel et al. | 501/96 X |
| 4,308,114 | 12/1981 | Das et al. | 204/67 |
| 4,327,186 | 4/1982 | Murata et al. | 501/92 |
| 4,341,611 | 7/1982 | Kaplan | 204/243 R |
| 4,379,852 | 4/1983 | Watanabe et al. | 501/96 X |
| 4,486,544 | 12/1984 | De Pous et al. | 501/96 |

Primary Examiner—Donald R. Valentine
Attorney, Agent, or Firm—N. L. Balmer

[57] ABSTRACT

High strength titanium diboride ($TiB_2$) articles which are obtained by sintering articles preformed from $TiB_2$ powder mixed with epoxy resin by means of isostatic molding using sintering temperatures found to be a critical variable for achieving maximum strength. Resistance to aluminum attack is achieved by removing contaminating oxides, nitrides, and carbides of titanium by selecting either annealing the sintered article in a boron nitride (BN) pack or by including a small amount of BN or elemental boron in the original $TiB_2$ powder, such that the finished article is substantially free of such contaminants.

5 Claims, 10 Drawing Figures

4,592,882

METHOD OF MAKING ALUMINUM-RESISTANT TITANIUM DIBORIDE ARTICLES

This application is a continuation of prior U.S. application Ser. No. 480,516, filed 3/30/83 now abandoned.

FIELD OF THE INVENTION

This invention relates generally to shaped titanium diboride ($TiB_2$) articles and more particularly to shapes suitable for use in Hall cells due to their improved resistance to attack by aluminum.

Aluminum metal is commonly obtained from cryolite or bauxite by their electrolysis in a Hall cell.

The aluminum industry has been developing improvements in the Hall cell over the years. Baffles and other devices are used in the pool of molten aluminum employed in Hall cells to reduce or eliminate waves or other disruptions in the surface. These disruptions are caused by eddy currents and other effects, both physical and electromagnetic, in the bath. The smoother interface thus produced allows for a reduced gap between the anode and the cathode, resulting in lower power costs.

The material of construction to be used in the aluminum-wetted portions of the cell must be electrically conductive, mechanically strong, thermally and chemically stable in the Hall cell environment, and resistant to thermal shock. Theoretically, $TiB_2$ is a suitable material, but tests have shown that the material as commercially manufactured lacks stability in the Hall cell environment. The aluminum-wetted portions of the cell are the bottom and walls of the cell and any protrusions or inlays in or on the cell bottom, which is the cathodic contact to the molten aluminum.

STATEMENT OF THE PRIOR ART

The use of $TiB_2$ tiles in aluminum reduction cells is discussed in U.S. Pat. Nos. 4,231,853 and 4,341,611; in both of these patents, the process for making the tiles is described as a hot-pressing operation and no mention is made of the damaging cubic phase contaminants addressed by the present invention.

Purification of $TiB_2$ powder by mixing the powder with a boron-supplying compound, such as BN, and heating the mixture in a crucible to remove the cubic phase composed of borides, oxides, nitrides, and carbides by reaction with boron is taught in U.S. Pat. No. 3,316,062, but the patent is directed to powders and does not teach the purification of formed bodies. Undesirable contamination may be introduced during the forming and sintering operations, even if powders purified by following this prior art are used.

OBJECTS AND SUMMARY OF THE INVENTION

The principal object of this invention is to provide an article of the disclosed type which combines simplicity, strength and durability in a high degree together with inexpensiveness of construction and a method of making the same.

Other objects of the invention will in part be obvious and in part hereinafter pointed out.

In summary, this invention resides in high strength titanium diboride ($TiB_2$) articles which are obtained by sintering articles preformed from $TiB_2$ powder mixed with epoxy resin by means of isostatic molding using sintering temperatures found to be a critical variable for achieving maximum strength and wherin resistance to aluminum attack is achieved by removing contaminating oxides, nitrides, and carbides of titanium by selecting either annealing the sintered article in a boron nitride (BN) pack or by including a small amount of BN or elemental boron in the original $TiB_2$ powder, such that the finished article is substantially free of such contaminants.

DETAILED DESCRIPTION OF THE INVENTION

The present invention is based on the unexpected and unobvious discoveries that:

(i) failure in the use of $TiB_2$ structures in the Hall cells was due to the presence therein of separate phase consisting of cubic crystals of titanium carbide (TiC), titanium nitride (TiN), titanium oxide (TiO), or mixtures thereof.

(ii) there is a best sintering temperature;

(iii) a formed and sintered $TiB_2$ article can be purified by a thermal treatment in a BN pack; and (iv) the discover that a purified article can also be made by including BN in the $TiB_2$ blend prior to forming and sintering.

The articles of the invention can be made by annealing at high temperature in a boron nitride (BN) pack a sintered article containing the harmful impurities. The impurities are converted to $TiB_2$ in situ, but the annealing operation causes an unavoidable loss in strength. It has been discovered that the initial sintering temperature of the $TiB_2$ article should be 2000° C.±25° C. for maximum strength of the finished product. In practice, however, a product can be made at initial sintering temperatures ranging from about 1600° C. to about 2100° C. if strength and conductivity can be sacrificed. The $TiB_2$ articles of the invention can also be obtained by combining a small amount of BN in the powdered $TiB_2$ blend prior to the forming and sintering of the article. The amount of BN used is calculated from the amount of impurity in the powder, so that little or no residual BN is present in the finished article after sintering. This method does not require any additional annealing after sintering.

Figure 1:
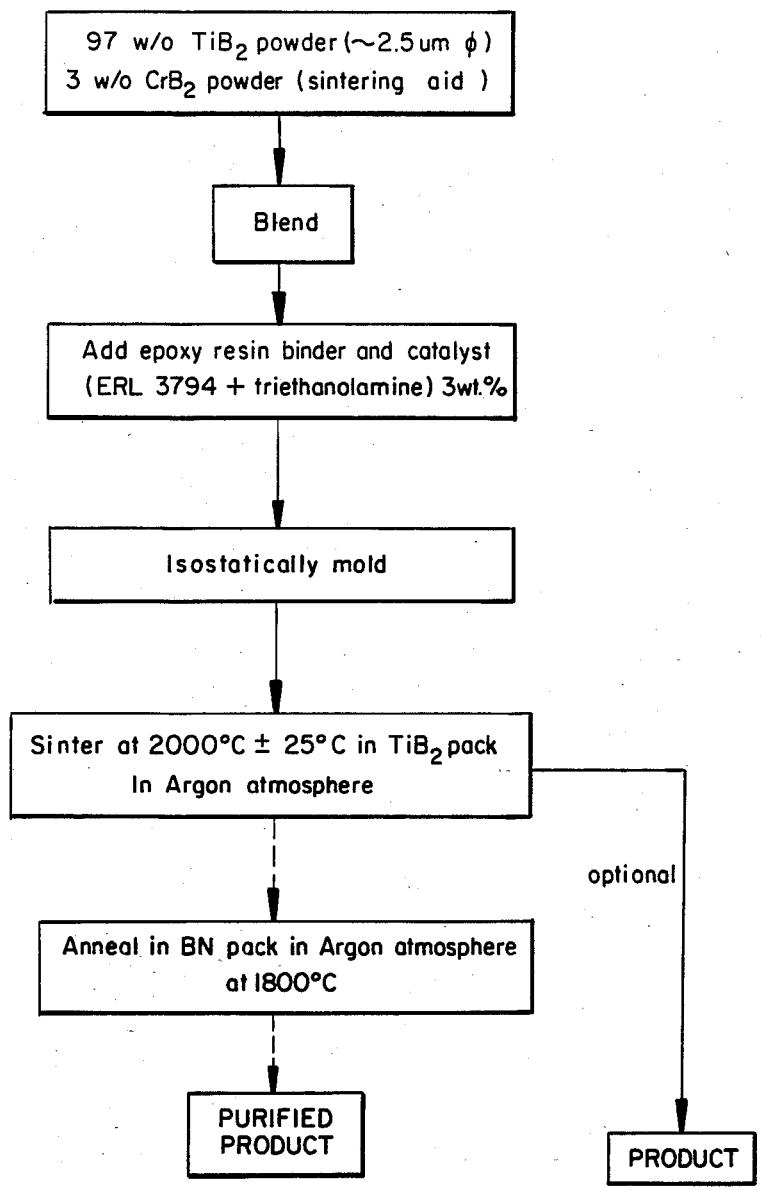
FIG. 1 is a flow diagram illustrating the method of the invention.
Figure 2:
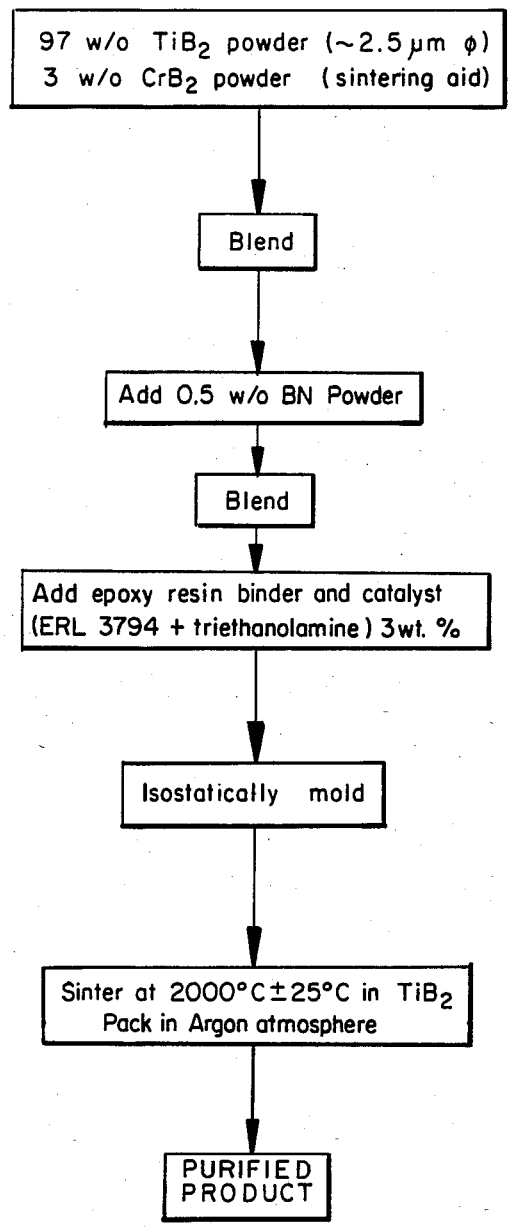
FIG. 2 is a flow diagram illustrating a modified version of the invention.
Figure 3A:
FIGS. 3a, 3b, 3c, and 3d are a group of scanning electron microscope (SEM) photos enlarged 5,000 and 20,000 times showing the microstructures of sintered $TiB_2$ shapes not following this invention after 28 and 72 hours in contact with molten aluminum.
Figure 3B:
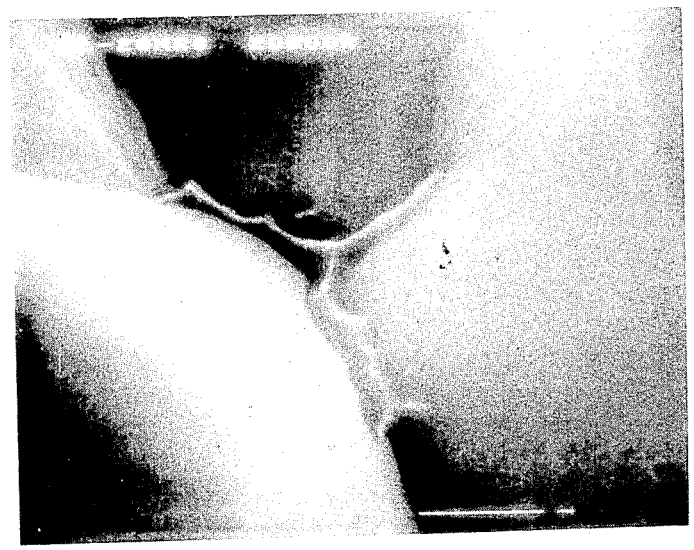
Figure 3C:
Figure 3D:
Figure 4A:
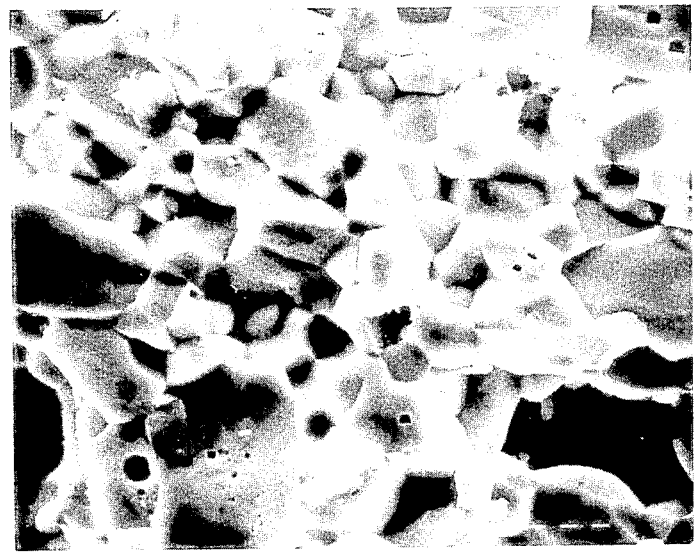
FIGS. 4a and 4b are a pair of photomicrographs enlarged 2,000 and 5,000 times and showing the microstructures of $TiB_2$ articles sintered and annealed according to this invention after 100 hours in contact with molten aluminum.
Figure 4B:

Referring to the flow diagrams of FIGS. 1 and 2, the method of the invention comprises mixing from about 96.5 to about 97.5 weight percent of $TiB_2$ powder, preferably having a particle size ranging from about 2.5 to about 3.0 microns with from about 2.0 to about 3.5 weight percent of a sintering aid such as chromium diboride; adding to the resulting blend an amount of from about 2.9 to about 3.0 of an epoxy binder and a catalyst such as triethanolamine; isostatically molding the mixture, followed by sintering at 2000° C. ±25° C. in a particle pack comprising sintered crushed $TiB_2$ under an inert atmosphere, suitably argon, or high vacuum (pressures below about $5 \times 10^{-3}$ Torr) with argon under high vacuum preferred.

In the embodiment of FIG. 1, the shape is annealed at about 1800° C. while in that of FIG. 2 from about 0.3 to about 1.2 weight percent of BN powder is added to the starting blend to remove the impurities.

Thus it will be seen that the sintered articles of the invention can be annealed at 1800° C. in a BN pack in an argon atmosphere, to convert any oxide, nitride, and carbide of titanium to the diboride ($TiB_2$). In practice, one may use annealing temperatures in the range of about 1700° to 1900° C., with 1800° C. being the optimum. The loss of strength associated with this annealing process amplifies the need for maximizing the strength during sintering.

Alternatively, a small amount of BN or elemental boron can be blended with the $TiB_2$ powder before the article is formed by isostatic pressing. The BN or boron then reacts with the impurities during the sintering operation. This is to be contrasted with $TiB_2$—BN composites wherein large amounts of BN are admixed with $TiB_2$. In the present case, when BN is employed, it is present only as a minor component that is essentially completely consumed by reaction with the impurities during sintering. This fact is important to the production of a $TiB_2$ product having low resistivity as the presence of residual BN increases the resistivity of the product.

In accordance with the foregoing, a $TiB_2$ shape was developed by changing the sintering temperature to improve the structure. The physical properties are shown in Table I, where a material made by using the reduced sintering temperature of this invention is compared with a prior art material that is the same except for sintering temperature.

TABLE I

| Physical Properties | Made By Prior Art | Made By Using The Sintering Temperature of this Invention | Change |
|---|---|---|---|
| 1. Flexural Strength | | | |
| (a) 25° C. | 27,500 psi | 59,000 psi | 115% higher |
| (b) 1000° C. | 14,700 | 21,200 psi | 44% higher |
| 2. Sonic Modulus, (psi × 10^6), 25° C. | 75.5 | 100.0 | 32% higher |
| 3. Electrical Resistivity (μΩm), 25° C. | 0.60 | 0.18 | 70% less |
| 4. Density, % of Theoretical | 94.9 | 94.6 | — |
| 5. Coefficient of Thermal Expansion (in/in/°C.) × 10^−6 | 8.2 | 7.8 | 5% lower |

TABLE I-continued

| Physical Properties | Made By Prior Art | Made By Using The Sintering Temperature of this Invention | Change |
|---|---|---|---|
| 6. Micro Cracks | Some | None | Improved |

From Table I, it can be seen that strength is improved dramatically and microcracks are eliminated. The improved strength results in greater resistance to thermal shock, a property that is essential in the Hall cell application. Thermal shock tests to 675° C. at 150°/minute and to 810° C. at 210° C./minute showed no cracking due to thermal shock.

An added advantage can be gained by removing impurities from the $TiB_2$. The common impurities are TiO, TiN, and TiC. When the $TiB_2$ with these impurities is exposed to molten aluminum, aluminum oxide, aluminum nitride, and aluminum carbide are formed. The crystal size for these reaction products is larger than the titanium compounds so the structure of the $TiB_2$ body is disrupted and microcracks form. This is believed to be the principal mechanism of aluminum penetration and attack.

The subject invention is further illustrated in a non-limiting fashion by the following examples.

EXAMPLE I

Purification by Annealing

Ninety-seven grams of $TiB_2$ powder (98.4% pure) was ball-milled with 3 g $CrB_2$ powder (99.5% pure) for 96 hours or until the particle size of the combination was 2.5 μm or finer, as measured on a Fisher Sub-Sieve Sizer. The ball-milled powder was mixed in a Hobart mixer with a solution of 33 cc acetone, 3 g Epoxy ERL 3794 (an epoxy resin product of Union Carbide Corporation) and 0.3 g triethanolamine until all the acetone evaporated. The mix was dried in an oven at 150° F. overnight and then micro-milled (i.e., milled using a swing-hammer mill) to break up agglomerates. The micro-milled powder was then isostatically molded into testing shapes, cured in sand to 365° F. in 24 hours in a conventional oven and then sintered in an induction vacuum furnace at 2000° C. in 2 hours under an argon flow rate of 6 SCFH. The shapes were sintered in sintered crushed $TiB_2$ pack to support the shapes to keep them from warping and to provide a uniform atmosphere. The sintered shapes had densities equivalent to 98% of the theoretical value. Finally, the testing shapes were annealed in a resistance heated tube furnace at 1800° C. in 2 hours under an argon flow rate of 5 SCFH. The shapes were packed entirely in BN powder pack in a BN tube for the annealing process.

Ten $TiB_2$ samples (2"×¼"×¼") sintered to 2000° C. in two hours and ten samples (2"×¼"×¼") sintered to 2000° C. in two hours followed by annealing to 1800° C. for two hours were evaluated in molten aluminum under the electrolytic action of a Hall cell. The samples were immersed in molten aluminum as described in Table II:

TABLE II

| No. of Samples | Process | Hrs. in Molten Aluminum |
| --- | --- | --- |
| 4 | Sintered | 75* |
| 6 | Sintered | 28 |
| 8 | Sintered & Annealed | 100 |

*These four samples were immersed in molten aluminum for 28 hours at first; they were removed and exposed to molten aluminum again for another 47 hours.

The samples that were exposed to aluminum were each soaked in 100 ml of a solution made up of 50 vol. % concentrated hydrochloric acid and 50 vol. % deionized water for 24 hours to dissolve aluminum from the surface that might affect the results of the measurement of physical properties of the samples. The physical properties of the tested samples are listed in Table III.

TABLE III

| Samples | Density Percent of Theoretical | Flexural Strength (psi × 10³) Room Temp. | Flexural Strength (psi × 10³) 1000° C. | Resist. (μΩm) | Sonic Modulus (psi × 10⁶) |
| --- | --- | --- | --- | --- | --- |
| Sintered | 94.7 | 46.1 | 19.0 | 0.25 | 76.2 |
| Sintered and Annealed in BN Pack | 93.3 | 40.6 | 24.7 | 0.25 | 74.1 |

As can be seen from Table III, the annealing process reduces room temperature flexural strength somewhat. As this appears to be unavoidable, it is all the more important that the optimum sintering temperature have been used in making the sample to be annealed in BN pack for purification.

Electron microscopy was used on representative samples of the materials in Table III to try to detect aluminum. The photographs in FIGS. 3a, 3b, 3c, and 3d show that aluminum concentrates at the grain boundaries between the TiB₂ particles, showing up as "fillets" between grains after 28 and 75 hours exposure. This aluminum remains although the sample was soaked in the hydrochloric acid solution, which removed only surface aluminum. The samples shown in FIG. 3 were not purified according to this invention. In contrast to FIGS. 3a, 3b, 3c, and 3d, FIGS. 4a, and 4b show no evidence of aluminum at the grain boundaries or elsewhere in the samples that were annealed in the BN pack after sintering. The aluminum has not penetrated from the molten bath in 100 hours of exposure.

EXAMPLE 2

Purification by Using BN Powder

Ninety-seven grams of TiB₂ powder (98.7% pure) was ball-milled with 3 g CrB₂ powder (99.5% pure) and 0.5 g BN powder (oxygen-free powder) for 96 hours or until the particle size of the combination was 2.5 μm or finer as measured on a Fisher Sub-Sieve Sizer. The ball-milled powder was mixed in a Hobart mixer with a solution of 33 cc acetone, 3 g Epoxy ERL 3794 and 0.3 g triethanolamine until all the acetone evaporated. The mix was dried in an oven afterward at 150° F. overnight and then micro-milled to break up agglomerates. The micro-milled powder was then isostatically molded into testing shapes, cured in sand to 365° F. in 24 hours in a conventional oven and then sintered in an induction furnace at 2000° C. in two hours under an argon flow rate of 4 SCFH. The shapes were sintered in sintered crushed TiB₂ pack to provide uniform atmosphere and to support the shapes to prevent warping. The sintered shapes had densities equivalent to 98% of the theoretical value and were free of cubic phases.

Fifty plates measuring nominally 5"×5"×⅜" were manufactured as above. The density of test samples cut from these plates were all in the range of 97% to 98% of the theoretical value. Representative samples of these plates were analyzed for nitrogen, carbon and oxygen with the results shown in Table IV.

TABLE IV

| | CHEMICAL ANALYSIS | | |
| --- | --- | --- | --- |
| | $N_2$ (Wt. %) | C (Wt. %) | $O_2$ (Wt. %) |
| Sample A | 0.000 | 0.130 | 0.820 |
| Sample B | 0.000 | 0.360 | 0.600 |
| Sample C | 0.000 | 0.290 | 0.610 |
| Average | 0.000 | 0.260 | 0.677 |

Analysis of representative samples by X-ray diffraction techniques detected no measurable cubic phase (TiO, TiN, TiB, or TiC) in the material produced.

Analysis of the TiB₂ powder from which these plates were made showed the following contaminants (before addition of the BN powder): 0.4 weight % nitrogen; 0.5 weight % carbon; and 1.3 weight % oxygen. At these concentrations, the contaminants would generate sufficient cubic phase to be readily detected by using X-ray diffraction techniques.

Figure 5:
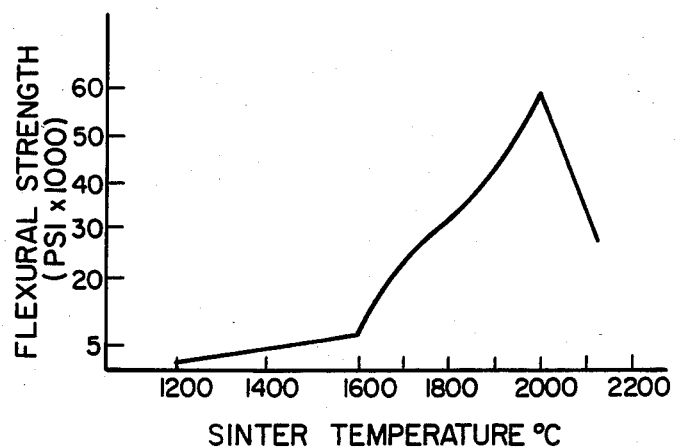
FIG. 5 is a graph, the curve of which shows the flexural strength of $TiB_2$ at 25° C. versus the sinter temperature that demonstrates the criticality of sinter temperature whether this invention is used or not. The data shown were obtained while not using any form of the present invention.

The graph of FIG. 5 shows that a sintering temperature of 2000° C.±25° C. is optimum. Higher temperatures cause drastic loss of strength and lower temperatures do not develop sufficient strength.

Figure 6:
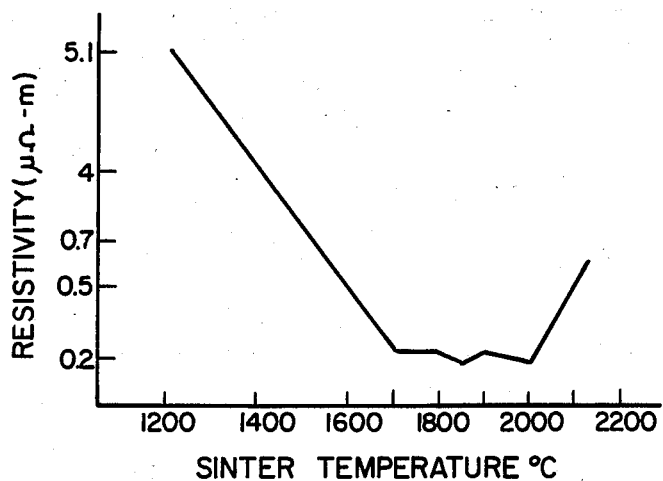
FIG. 6 is a graph, the curve of which shows the electrical resistivity of $TiB_2$ at 25° C. versus sinter temperature. The data shown were obtained while not using any form of the present invention.

Electrical resistivity is another important variable in TiB₂ articles. FIG. 6 shows that the resistivity is minimum at the preferred sintering temperature of 2000° C. The use of higher temperatures is detrimental and results in drastically increased resistivity.

The article of the invention has been thoroughly tested under actual use conditions and has been found to be completely successful for the accomplishment of the above stated objects of the invention.

The practice of the invention hereinabove described will be evident to those skilled in the art to which it relates from a consideration of the foregoing.

It will thus be seen that there is provided an article in which the several objects of this invention are achieved, and which is well adapted to meet the conditions of practical use.

I claim:

1. A method for making a shaped TiB₂ article essentially free of TiO, TiN, TiB and TiC cubic phase impurities comprising: forming said article from finely divided TiB₂ containing at least one of said impurities, a sintering aid, and a scavenger selected from the group consisting of BN and elemental boron; and sintering said article between about 1600° C. and about 2100° C. thereby reacting said scavenger with said impurities so that essentially none of said impurities or scavenger is present in said article after sintering.

2. The method of claim 1 wherein said scavenger is added in the amount of from about 0.3 to about 1.2 weight percent.

3. A method for making a shaped TiB₂ article essentially free of TiO, TiN and TiC cubic phase impurities comprising forming said article from finely divided TiB₂ containing at least one of said impurities and a sintering aid; sintering said article between about 1600° C. and about 2100° C.; and annealing said article in a BN pack between about 1700° C. and about 1900° C. thereby reacting said impurities with said pack so that essentially none of said impurities is present in said article after annealing.

4. The method of claim 1, 2 or 3 wherein said sintering temperature is between about 1975° C. and about 2025° C.

5. The method of claim 4 wherein said preforming is by isostatic molding.

* * * * *